J. GEARING.

Conductors for Rolling-Mills.

No. 6,149. Reissued Nov. 24, 1874.

WITNESSES
Philip W. Hales
Joseph C. Shinn By

INVENTOR
John Gearing.
Per Parker H. Sweet, Jr.
Assoc. Attorney

THE GRAPHIC CO. PHOTO-LITH. 39 & 41 PARK PLACE, N.Y.

UNITED STATES PATENT OFFICE.

JOHN GEARING, OF PITTSBURG, PA., ASSIGNOR OF TWO-THIRDS INTEREST TO RICHARD PERRY AND EDWARD PERRY, OF SAME PLACE.

IMPROVEMENT IN CONDUCTORS FOR ROLLING-MILLS.

Specification forming part of Letters Patent No. 93,699, dated August 17, 1869; reissue No. 6,149, dated November 24, 1874; application filed August 28, 1874.

*To all whom it may concern:*

Be it known that I, JOHN GEARING, of Pittsburg, in the county of Allegheny and State of Pennsylvania, have invented a certain new and useful Improvement in Conductor for Rolling-Mills for Band and Hoop Iron; and I do hereby declare that the following is a full, clear, and exact description thereof, reference being had to the accompanying drawings and to the letters of reference marked thereon.

My invention relates to an improvement in conductor for rolling-mills for conducting band and hoop iron from rolls; and consists in the use of an inclined trough or conductor provided with a detachable bottom, stripping-guide, and a deflector, the inner ends of said trough, stripping-guide, and deflector corresponding in form to the circle of the rolls and adjustable to the interval between them, the whole being so arranged and combined with the rolls that the hoop or band iron in its passage from between the rolls is conducted off, through the medium of said stripping-guide, deflector, and trough, in a cheap, effective, and simple manner.

To enable others skilled in the art to make and use my invention, I will proceed to describe more fully its construction and operation.

Figure 1:
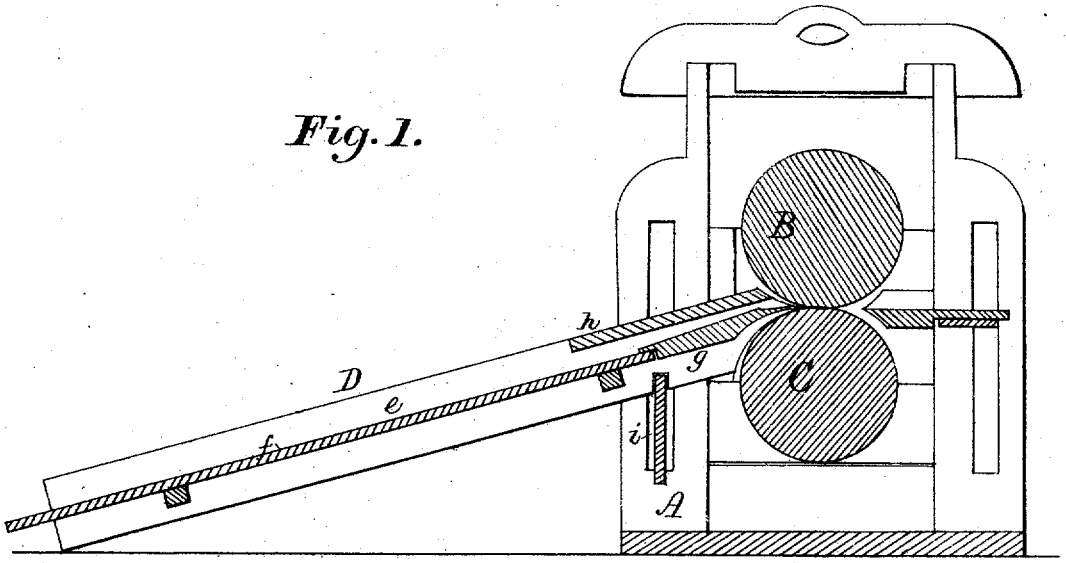
Figure 2:
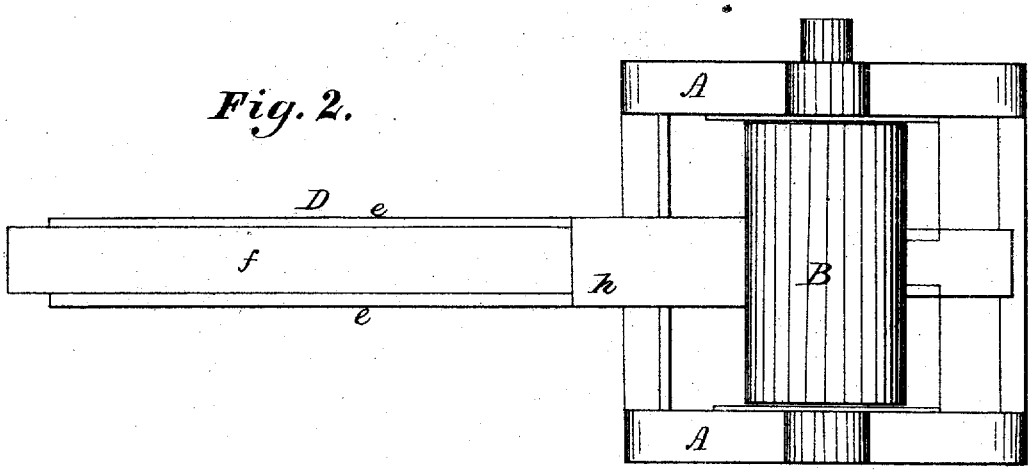

In the accompanying drawings, which form part of my specification, Figure 1 is a vertical longitudinal section of my improvement in trough or conductor, and represents it arranged in juxtaposition with relation to the rolls and the interval between them. Fig. 2 is a top view or plan of the same.

In the drawings, A represents the housing or supports for the rolls B and C, said housing and rolls being of the ordinary construction, and operating in the manner usual to rolls used in the manufacture of hoop or band iron. D represents the conductor or trough, and consists of sides *e* and bottom *f*. The end of the trough next to the rolls is furnished with a detachable stripping-guide, *g*, which forms part of the bottom of the trough, and a deflector-plate, *h*, which serves as a cover for a part of the inner end of the trough or conductor. The plane of the bottom of the trough or conductor is arranged at an acute angle to the horizontal plane of the space between the rolls B and C. The trough or conductor D is supported on a bar, *i*, the ends of which are supported in the housing A, and is arranged at right angles to the longitudinal plane of the trough or conductor D. The form of the inner end of the trough D, stripping-guide *g*, and deflector *h* are adapted in form to the circle of the rolls, as clearly shown in Fig. 1.

The end of the hoop or band iron, in passing from between the rolls, will enter the space between the stripping-guide *g* and deflector *h*, which will cause it to pass down on the inclined bottom of the trough or conductor, thereby conducting it from the rolls in a cheap, simple, and efficient manner, dispensing with the labor and expense of the carrying off by hand.

I am aware that a trough or conductor has been used in combination with rolls for carrying off rounds, half-rounds, oval and other forms of iron; but such iron is heavy and is easily manipulated with relation to guiding it in its passage from the rolls. But, in contradistinction to such trough and iron, my invention relates to an inclined trough having a stripping-guide and deflector-plate, as hereinbefore described, not known prior to my invention, for conducting off from the rolls hoop or band iron through the medium of the trough arranged with relation to the rolls as hereinbefore described.

Having thus described my improved conductor for rolling-mills, what I claim as of my invention is—

1. The combination, with rolls for rolling metal, of an inclined trough for directing the metal from the rolls to the floor, and a separable deflector-plate, *h*, for deflecting and directing the metal into said trough as it emerges from between the rolls, substantially as described.

2. The combination, with rolls for rolling metal, of an inclined trough for directing the metal from the rolls to the floor, a deflector-plate for deflecting and guiding the metal into said trough as it emerges from between the rolls, and a separable stripping and guiding plate, *g*, substantially as described.

JOHN GEARING.

Witnesses:

A. C. JOHNSTON,

PARKER H. SWEET, Jr.